Patented June 3, 1941

2,244,421

UNITED STATES PATENT OFFICE 2,244,421

METHOD OF PREPARING MONO-SUBSTITUTED CYANAMIDES AND THEIR POLYMERS

Walter P. Ericks, Cos Cob, Conn., assignor to American Cyanamid Company, New York, N. Y., a corporation of Maine No Drawing. Application July 27, 1939, Serial No. 286,779

15 Claims. (Cl. 260—248)

This invention relates to a method of preparing mono-substituted cyanamides and their polymers.

According to the literature the product obtained in the reaction between ethylene oxide and a metal salt of cyanamide readily undergoes intramolecular rearrangement and can exist in several tautomeric forms of straight-chain and/or cyclic nature such as:

NC.NH.CH$_2$.CH$_2$.OH
HN:C:N.CH$_2$.CH$_2$.OH
H$_2$N.C:N.CH$_2$.CH$_2$.O
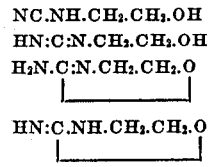
HN:C.NH.CH$_2$.CH$_2$.O
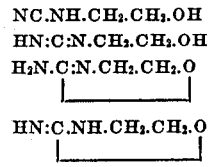

Although such designations as monoethylol cyanamide, hydroxyethyl cyanamide, cyanaminoethyl alcohol and 2-amino-oxazoline have been used to describe the chemical structure of the compound, the latter remains indefinite and the mechanism of rearrangement occurring even within its individual molecules is obscure.

In view of the above, the compounds prepared according to this invention will be hereinafter referred to as alkylol cyanamides.

A known method of preparing the monoethylol cyanamide consists in introducing ethylene oxide into an aqueous solution of sodium cyanamide and allowing the mixture to stand for several hours. The aqueous solution is then extracted successively with several portions of chloroform. The product is obtained by distilling off the chloroform in vacuum. It is necessary to use large quantities of chloroform due to the fact that the ethylol cyanamide is more soluble in water than in the chloroform. Consequently, for commercial operation where economy and efficiency are essential, it is readily seen that this method is impracticable since in addition to the excessive quantity of solvent utilized, a large amount of equipment and time are required in extracting the product.

It is among the objects of this invention to avoid the disadvantages of the above known method and provide a process universally applicable for the production of monoethylol cyanamide and other homologues and substitution products thereof herein referred to as alkylol cyanamides which is highly efficient and simple as to the successful operation thereof.

I have found that when equimolecular ratios of an alkaline earth metal cyanamide and a compound containing an ethylene oxide ring are reacted together in an aqueous solution, an alcohol derivative is obtained, but when two or more mols of the compound containing an ethylene oxide ring are reacted with each mol of the cyanamide compound, there are obtained ether alcohol derivatives.

As a consequence of tautomerism, either of the above types of compounds may occur in several isomeric forms. Possibly 2, 3 or even 4 of these isomerides may co-exist in a state of equilibrium. According to physical or chemical influence, one of these isomerides will predominate and I, therefore, designate the reaction product as a monomeric compound with an open chain structure of the following representative formula:

N≡C.NH.R.OH in which R is either an alkyl or an alkoxy alkyl group. These products are all extremely reactive and polymerize readily upon heating at a temperature exceeding 65° C. to the dimer which has the following probable structural formula:

in which R is as defined above. Upon additional heating, further polymerization may occur with the possible formation of trisubstituted triazines.

The alkylol cyanamides are hygroscopic and readily take up moisture at ordinary temperatures. When an attempt was made to distill the monoethylol cyanamide under reduced pressure, the product originally amber in color became colorless and polymerization occurred. On further heating a pale yellow coloration occurred, and the product on cooling was a hard, transparent resin, soluble in water.

Monoethylol cyanamide, when heated at atmospheric pressure to 130° C. gradually became colorless and an odor resembling that of acetaldehyde was given off. When heated at temperatures between 150° and 200° C. an odor of ammonia was predominant. The material became very viscous and took on a slight yellow tinge. Upon cooling it formed a solid, non-sticky, transparent resin. Upon further heating at temperatures between 220 and 260° C., the yellow coloration of the resin increased in intensity.

Samples of monoethylol cyanamide:

(1) Dried on the steam bath, an amber, viscous liquid;
(2) Heated to 165° C., a colorless, transparent, semi-solid resin;
(3) Heated to 215° C., a pale yellow, transparent, solid resin;

were subjected to spectrophotometric examination with the object of detecting evidence which would support the suggested reactions involving the following transformations:

1. 6 mols N≡CNHCH₂CH₂OH ⟶

3 mols $\begin{array}{c} N\equiv CNCH_2CH_2OH \\ | \\ HN=CNHCH_2CH_2OH \end{array}$ ⟶

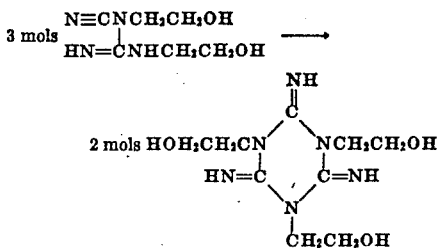

2. 6 mols N≡CNHCH₂CH₂OH ⟶

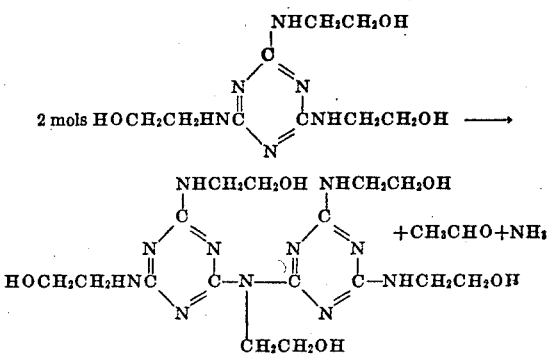

+ CH₃CHO + NH₃

The spectrophotometric analysis indicated that the product which was heated to 215° C. had less of the triple bond, N≡C, than that which was heated to 165° C., and likewise the latter showed less evidence of the same bond as compared with sample #1. This information, in addition to the previously noted odors of acetaldehyde and ammonia, strengthened the possibility of the suggested reaction #2. It is likely that other reactions take place concurrently and subsequently such as illustrated in reaction #1.

The present invention contemplates the preparation of all alkylol cyanamides regardless of the state of partial or complete polymerization.

In practicing my invention, an aqueous slurry of an alkaline earth metal cyanamide is prepared by introducing the cyanamide compound in small portions into water which is stirred rapidly. A compound containing an ethylene oxide ring is then introduced slowly at atmospheric pressure into the agitated suspension which is maintained at a temperature not exceeding the boiling point of said compound. If desired, the reaction may be carried out at elevated pressures. The mixture is filtered and the filter cake washed with water. A precipitant is added to the combined filtrate and washings to throw out the alkaline earth metal as a substantially insoluble compound which is filtered off. The alkylol cyanamide is obtained from the filtrate after removing the water by evaporation at low temperatures. Since these products polymerize readily, high evaporation temperatures should be avoided. A compromise between undesirably high and uneconomically low temperatures indicate 65° C. as an optimum at atmpospheric pressure. It is preferable to carry out the evaporation under reduced pressures of 10–20 mm. mercury.

Precipitants such as carbon dioxide may be used in this process or other reactants such as oxalic acid, sulfuric acid and phosphoric acid which form substantially water-insoluble compounds with the alkaline earth metals. When employing either sulfuric or phosphoric acid as the precipitant, such quantities of these materials are added until a pH of approximately 7.5 is reached and thereafter the remaining trace of alkaline earth metal is removed with carbon dioxide.

This process is particularly adaptable to commercial operation in that I may utilize crude calcium cyanamide which is an inexpensive, plentiful cyanamide material. Crude calcium cyanamide, known to the trade as Cyanamid, contains more than 60% calcium cyanamide. The remaining inert materials, such as calcium carbonate, -hydroxide, free carbon, etc., are removed from the reacted slurry by filtration.

An important advantage as compared with former methods is that the use of an organic solvent for the extraction of the product is eliminated. Small amounts of alkaline earth metals remaining in the reacted slurry are thoroughly removed by means of a precipitant such as carbon dioxide. The volume of water to be evaporated is not excessively great because the alkylol cyanamide formed in the course of reaction is easily soluble in water. Economy in size of equipment and time consumed lend to the simplicity of the process. The yield of the product in most cases is greater than 90% of theory.

This invention will be illustrated in greater detail by the preparation of the compounds shown in the following examples. The materials employed are in parts by weight.

EXAMPLE I

*Monoethylol cyanamide*

268 parts of cyanamid (60.6% NCNCa) were introduced in small portions into 600 parts of water which were stirred rapidly at a temperature not exceeding 25° C. The mixture was stirred for 30 minutes and then cooled to about 5° C. 88 parts of ethylene oxide were then introduced slowly into the agitated suspension at a temperature preferably not exceeding 10° C., care being taken that no large excess of ethylene oxide was present at any time. After all the ethylene oxide had been added, the mixture was stirred for one hour at a temperature of 5–10° C. The agitation was then stopped, the temperature brought up to about 25–30° C. within a few hours and the mixture filtered at this temperature. The filter cake was washed with water. Carbon dioxide was passed into the combined filtrate and washings to precipitate the calcium as carbonate, which was filtered off. The filtrate was transferred to an evaporator and the water evaporated under reduced pressure of 10–20 mm. mercury. The product was a pale yellow thick, oily syrup, equal to 91.8% of the theoretical yield.

EXAMPLE II

*Monoethylol cyanamide*

A slurry of 1072 parts of cyanamid (60.6% NCNCa) in 3000 parts of water was prepared, using the procedure described in Example I. 352 parts of ethylene oxide were introduced slowly into the agitated suspension at a temperature of 0–5° C. within a period of one hour and 15 minutes. The mixture was agitated for 4½ hours at a temperature not exceeding 10° C. Agitation was discontinued and the temperature of the mixture brought up to about 25° C. within a few hours. The mixture was filtered and the filter cake washed with three small portions of water. An aqueous solution of oxalic acid was slowly added with stirring to the combined filtrate and washings until further addition did not produce a precipitate of calcium oxalate. After standing for a few hours, a sample of the mixture was again tested with the oxalic acid solution. The mixture was then filtered and the filtrate evaporated at a temperature of about 65° C. The product was a pale yellow viscous liquid equal to 95.5% of the theoretical yield.

Example III

Monopropylol cyanamide 536 parts of cyanamid (60.6% NCNCa) were introduced in small portions into 1500 parts of water which were stirred rapidly at a temperature not exceeding 25° C. 232 parts of 1,2-propylene oxide were introduced slowly into the agitated suspension keeping the temperature below 25° C. After the propylene oxide had been added, the mixture was stirred for two hours, filtered and the filter cake washed with water. Carbon dioxide was passed into the combined filtrate and washings to precipitate the remaining calcium as carbonate. The mixture was filtered and the filtrate evaporated under reduced pressure of 10–20 mm. mercury. The product was a viscous yellow colored liquid.

Example IV

Mono-2,3-dihydroxy propyl cyanamide

A slurry of 402 parts of cyanamid (60.6% NCNCa) in 1100 parts of water was prepared using the procedure described in Example I. 222 parts of glycidol

were slowly added to the slurry which was agitated and kept at a temperature not exceeding 25° C. After standing for several hours, the mixture was filtered and the filter cake washed with water. The combined filtrate and washings were treated with carbon dioxide. The mixture was filtered to remove the calcium carbonate. The filtrate was evaporated under reduced pressure of 10–20 mm. mercury. The product was a viscous syrup equivalent to 88.5% of the theoretical yield.

Example V

Mono-2-hydroxy-3-chloro-propyl cyanamide

A slurry of 402 parts of cyanamid (60.6% NCNCa) in 1100 parts of water was prepared using the procedure described in Example I. 277.5 parts of epichlorhydrin were slowly added to the slurry which was agitated and kept at a temperature not exceeding 35° C. After standing for several hours, the mixture was filtered and the filter cake washed with water. The combined filtrate and washings were treated with carbon dioxide. The mixture was filtered to remove the calcium carbonate. The filtrate was evaporated at atmospheric pressure at a temperature of approximately 60° C. until a viscous syrup was obtained.

Example VI

Monobutylol cyanamide 134 parts of cyanamid (60.6% NCNCa) were introduced in small portions into 350 parts of water, which were stirred rapidly at a temperature not exceeding 25° C. 72 parts of isobutylene oxide were introduced slowly into the agitated suspension, keeping the temperature below 25° C. After the butylene oxide had been added, the mixture was stirred for two hours, filtered and the filter cake washed with water. Carbon dioxide was passed into the combined filtrate and washings to precipitate the remaining calcium as carbonate. The mixture was agitated with 4 parts of charcoal, then filtered and the filtrate evaporated at a temperature of about 65° C. The product was a colorless viscous liquid.

Example VII

Isopropyl-ethylol cyanamide

A slurry of 26.8 parts of cyanamid (60.6% NCNCa) in 60 parts of water was prepared using the procedure described in Example I. 17.2 parts of isopropyl-ethylene oxide

were added slowly to the agitated suspension at a temperature of 25–30° C. The mixture was stirred for several hours, then filtered and the filter cake washed with water. The combined filtrate and washings were treated with carbon dioxide. The mixture was filtered to remove the calcium carbonate. The filtrate was evaporated under reduced pressure of 10–20 mm. mercury to remove the water. The product was a pale yellow viscous liquid.

Example VIII

Tetramethyl-ethylol cyanamide

A slurry of 13.4 parts of cyanamid (60.6% NCNCa) in 30 parts of water was prepared using the procedure described in Example I. 10 parts of tetramethylethylene oxide

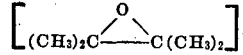

were introduced slowly into the agitated suspension at a temperature of 30–35° C. during a period of one hour. After stirring for several hours at a temperature of 35–40° C., the mixture was filtered and the filter cake washed with small portions of water. Carbon dioxide was passed into the combined filtrate and washings to precipitate the remaining calcium as carbonate. The mixture was filtered and the filtrate evaporated at a temperature of about 65° C. The product was a pale yellow viscous syrup.

Example IX

N-hexyl-ethylol cyanamide

A slurry of 26.8 parts of cyanamid (60.6% NCNCa) in 60 parts of water was prepared using the procedure described in Example I. 25.6 parts of n-hexyl-ethylene oxide

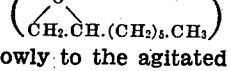

were added slowly to the agitated suspension at a temperature of about 65° C. The mixture was cooled to about 40° C., stirred for twelve hours, filtered and the filter cake washed with water. Carbon dioxide was passed into the combined filtrate and washings to precipitate the calcium as carbonate which was filtered off. The filtrate was evaporated under reduced pressure of 10–20 mm. mercury to remove the water. The product was a pale yellow crystalline material.

Similarly other higher members of the alkylol cyanamide series may be obtained by using as a starting material the corresponding compound having a reactive ethylene oxide ring formation and the proper substituent into the ethylene ring.

Furthermore the ether alcohol derivatives which I have designated as the alkoxyalkylol cyanamides can be prepared in like manner with the exception that two or more mols of a compound containing an ethylene oxide ring are reacted with each mol of an alkaline earth metal cyanamide.

The compounds prepared according to this invention are of particular utility in the formulation of coating and molding compositions, as textile assistants, as plasticizers and as starting materials for the synthesis of artificial fibers, laminated materials, resins, adhesives and other useful products.

Condensation products of the alkylol cyanamides with organic monocarboxylic acids as described in my application Serial No. 278,456 filed June 10, 1939, are surface-active agents of the cation-active type; that is to say, their surface-active properties are due to the electropositive portion of the molecule. For this reason, they are well suited for wetting and softening wool, cotton, cellulose acetate, cellulose nitrate, viscose and similar threads and fabrics, as emulsifying agents for the preparation of emulsions of hydrocarbon oils, glyceride fats and oils and the like, as well as for de-emulsification of oil emulsions, in the formulation of printing inks, dye pastes, dye baths, as softeners for leather, as flotation agents, in the application of rubber latex emulsions to wool, cotton and rayon textiles, in preparing emulsions of resins and the like.

While the invention has been described with particular reference to specific embodiments, it is to be understood that it is not to be limited thereto but is to be construed broadly and restricted solely by the scope of the appended claims.

I claim:

1. The method which comprises reacting an alkaline earth metal cyanamide in an aqueous slurry with a compound containing an ethylene oxide ring, removing insoluble materials, precipitating the alkaline earth metal present as a substantially insoluble compound and removing the same, evaporating the water from the aqueous solution and recovering the product.

2. The method which comprises reacting calcium cyanamide in an aqueous slurry with a compound containing an ethylene oxide ring, removing insoluble materials, precipitating the calcium present as a substantially insoluble compound and removing the same, evaporating the water from the aqueous solution and recovering the product.

3. Method of claim 1 in which the evaporation is carried out at reduced pressure.

4. Method of claim 1 in which the temperature during the reaction and evaporation is maintained no higher than 65° C.

5. The method which comprises reacting an alkaline earth metal cyanamide in an aqueous slurry with a compound containing an ethylene oxide ring, removing insoluble materials, reacting the aqueous solution with carbon dioxide, removing the insoluble carbonate material, evaporating the water from the aqueous solution and recovering the product.

6. A method of preparing alkylol cyanamides which comprises reacting calcium cyanamide in an aqueous slurry with a compound containing an ethylene oxide ring, removing insoluble materials, reacting the aqueous solution with carbon dioxide, removing the insoluble calcium carbonate, evaporating the water from the aqueous solution and maintaining the temperature at a point where all of the formed alkylol cyanamide is not polymerized.

7. A method of preparing alkylol cyanamides which comprises reacting in an aqueous slurry equimolecular quantities of an alkaline earth metal cyanamide and a compound containing an ethylene oxide ring, removing insoluble materials, precipitating the alkaline earth metal present as a substantially insoluble compound and removing the same, evaporating the water from the aqueous solution and maintaining the temperature at a point where all of the formed alkylol cyanamide is not polymerized.

8. A method of preparing alkylol cyanamides which comprises reacting in an aqueous slurry equimolecular quantities of calcium cyanamide with a compound containing an ethylene oxide ring, removing insoluble materials, precipitating the calcium present as a substantially insoluble compound and removing the same, evaporating the water from the aqueous solution and maintaining the temperature at a point where all of the formed alkylol cyanamide is not polymerized.

9. A method of preparing alkylol cyanamides which comprises reacting in an aqueous slurry equimolecular quantities of calcium cyanamide and a compound containing an ethylene oxide ring, removing insoluble materials, reacting the aqueous solution with carbon dioxide, removing the insoluble calcium carbonate, evaporating the water from the aqueous solution and maintaining the temperature at a point where all of the formed alkylol cyanamide is not polymerized.

10. A method of preparing monoethylol cyanamide which comprises reacting in an aqueous slurry equimolecular quantities of an alkaline earth metal cyanamide and ethylene oxide, removing insoluble materials, precipitating the alkaline earth metal present as a substantially insoluble compound and removing the same, evaporating the water from the aqueous solution and maintaining the temperature at a point where all of the formed alkylol cyanamide is not polymerized.

11. A method of preparing monopropylol cyanamide which comprises reacting in an aqueous slurry equimolecular quantities of an alkaline earth metal cyanamide and 1,2-propylene oxide, removing insoluble materials, precipitating the alkaline earth metal present as a substantially insoluble compound and removing the same, evaporating the water from the aqueous solution and maintaining the temperature at a point where all of the formed alkylol cyanamide is not polymerized.

12. A method of preparing mono-2,3-dihydroxy propyl cyanamide which comprises reacting in an aqueous slurry equimolecular quantities of an alkaline earth metal cyanamide and glycidol, removing insoluble materials, precipitating the alkaline earth metal present as a substantially insoluble compound and removing the same, evaporating the water from the aqueous solution and maintaining the temperature at a point where all of the formed alkylol cyanamide is not polymerized.

13. A method of preparing monoethylol cyanamide which comprises reacting in an aqueous slurry equimolecular quantities of calcium cyanamide and ethylene oxide at a temperature not exceeding 10° C., removing insoluble materials, reacting the solution with carbon dioxide, removing the calcium carbonate and evaporating the water from the solution under reduced pressure of 10-20 mm. mercury.

14. A method of preparing monopropylol cyanamide which comprises reacting in an aqueous slurry equimolecular quantities of calcium cyanamide and 1,2-propylene oxide at a temperature not exceeding 25° C., removing insoluble materials, reacting the solution with carbon dioxide, removing the calcium carbonate and evaporating the water from the solution under reduced pressure of 10-20 mm. mercury.

15. A method of preparing mono-2,3-dihydroxy propyl cyanamide which comprises reacting in an aqueous slurry equimolecular quantities of calcium cyanamide and glycidol at a temperature not exceeding 25° C., removing insoluble materials, reacting the solution with carbon dioxide, removing the calcium carbonate and evaporating the water from the solution under reduced pressure of 10-20 mm. mercury.

WALTER P. ERICKS.